April 1, 1930. B. A. UTTER 1,752,868
CASKET HANDLE
Filed Sept. 10, 1928
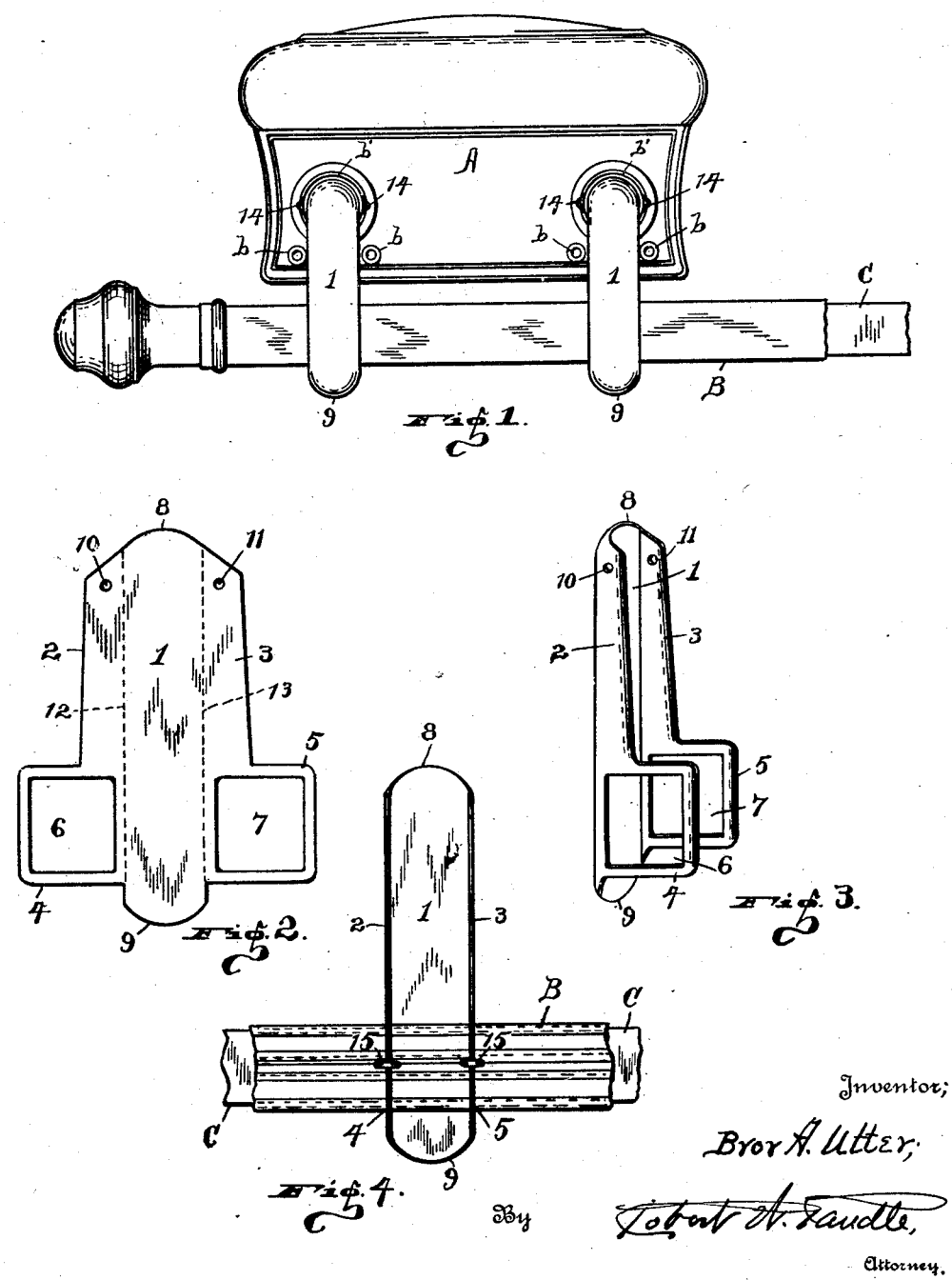

Patented Apr. 1, 1930

1,752,868

UNITED STATES PATENT OFFICE

BROR A. UTTER, OF RICHMOND, INDIANA, ASSIGNOR TO McCLELLAND CASKET HARDWARE COMPANY, OF RICHMOND, INDIANA, A CORPORATION OF INDIANA

CASKET HANDLE

Application filed September 10, 1928. Serial No. 304,939.

The object of my present invention, broadly speaking, is to provide certain specific improvements in handles for burial caskets whereby the handles may be made at a minimum of cost and with a maximum of efficiency and that without lowering the quality or the appearance of the finished product.

The specific object of this invention is to provide means whereby each of the arms of a handle can be stamped and formed into proper shape from sheet-metal stock, the same being done at practically one operation of an automatic machine constructed for that purpose, and at the same time providing a construction which is strong and durable in practice, mechanically efficient in operation, and at the same time having an artistic appearance when assembled in operative condition.

Other minor objects and particular advantages of my invention will be brought out in the following description thereof.

One manner of carrying out the objects of my invention is shown in the accompanying drawings, in which—

Figure 1 is a face view of a casket handle in which my invention is incorporated. Figure 2 is a plan view of one of the arms opened out flat, that is as it would appear just after being stamped out and before being bent to its final shape. Figure 3 shows a perspective view of one of the arms after being bent to its final shape. And Figure 4 is a rear or inner side view of the handle bar and of one of the arms, showing the means for securing them together.

Similar indices denote like parts throughout the several views.

In order that the construction, the operation, and the advantages of this invention may be more fully undersood and appreciated, I will now take up a detailed description thereof, in which I will set forth the same as fully and as comprehensively as I may.

In the drawings letter A designates the face-lug or plate which is to be secured onto the side of a burial casket, by means of screws to be inserted through the apertures $b$. Also two large apertures $b'$ are formed through the plate A, for the purpose hereinafter explained.

Letter B designates the handle-bar proper, which is usually formed of sheet-metal secured around the wooden filler C, in order to provide proper strength and rigidity.

All of said parts are of common construction and I make no claim thereto per se.

The invention proper resides in the construction of the arms which connect the plate A and the handle-bar B, and each of said arms are identical with each other in every particular.

Each of said arms is first stamped out from a flat sheet of material, such as steel, the shape given thereto being attained by a cutting die, whereby each arm is of cruciform shape as in Fig. 2, thereby providing a central portion 1; wings or flanges 2 and 3; the cage portions 4 and 5, having apertures 6 and 7, respectively, formed therethrough; the nose portion 8; and the tail portion 9.

Near the nose portion 8 the respective pivot apertures 10 and 11 are formed through the flanges or sides 2 and 3.

After being formed flat, as in Fig. 2, the flat member is then bent on the lines 12 and 13 whereby the flanges 2 and 3 are brought parallel with each other and at right-angles to the central portion 1, thereby causing the material to assume the shape shown in Fig. 3. At the same time the nose portion 8 is formed curved, being bent inwardly; also the tail portion 9 may likewise be curved inward as desired to form the desired finish.

After the arm is completed, as set forth, I next insert the curved nose portion 8 into an aperture $b'$ where it is hinged by pivots 14 which are mounted in bearings at the sides of the apertures $b'$ and extend across horizontally through the apertures 10 and 11, as is shown in Fig. 1.

The next operation is to insert the handle-bar B through the apertures 6 and 7 and then bring it to the position desired, after which staples 15 are placed astride the inner members of the cage portions 4 and 5 and driven through the handle-bar B into the wood filler C, whereby the arms and the handle-bar will be securely connected together but allowing the handle-bar to be raised and lowered, as the arms will be free to turn on their pivots 14 from vertical to horizontal position, but they will have only a quarter turn of movement.

By this construction the arms can be stamped out of one piece of material; they will have a maximum of strength; will be very easily assembled or disassembled; and will be pleasing in appearance.

Having now fully shown and described my invention, what I claim, and desire to secure by Letters Patent of the United States, is—

A casket handle arm formed from a flat blank of sheet metal, said blank being of inverted cruciform shape with the extending cross portions thereof forming cages, said blank bent on two parallel lines to form a central portion and two side portions parallel with each other and at right-angles to the central portion with said side portions including said cages.

In testimony whereof I have hereunto subscribed my name to this application.

BROR A. UTTER.